United States Patent
Utsumi (12)

(10) Patent No.: US 6,254,234 B1
(45) Date of Patent: Jul. 3, 2001

(54) LENS HOLDING MECHANISM OF FRONT FRAME FOR SPECTACLES

(75) Inventor: Isao Utsumi, Nara-Ken (JP)

(73) Assignee: Utsumi Optical Products, Inc., Nara (JP)

( * ) Notice: Subject to any disclaimer, the term of this patent is extended or adjusted under 35 U.S.C. 154(b) by 0 days.

(21) Appl. No.: 09/381,161

(22) PCT Filed: Jun. 23, 1998

(86) PCT No.: PCT/JP98/02782

§ 371 Date: Sep. 16, 1999

§ 102(e) Date: Sep. 16, 1999

(87) PCT Pub. No.: WO99/67676

PCT Pub. Date: Dec. 29, 1999

(51) Int. Cl.⁷ .................................................. G02C 1/00
(52) U.S. Cl. ................................................ 351/86; 351/83
(58) Field of Search .................................. 351/86, 83, 90, 351/91, 92, 103, 106, 41

(56) References Cited

FOREIGN PATENT DOCUMENTS 56-126611  9/1981  (JP).
61-150332  9/1986  (JP).

Primary Examiner—Hung Xuan Dang
(74) Attorney, Agent, or Firm—Burns, Doane, Swecker & Mathis, LLP

(57) ABSTRACT

A glasses' front frame having a V-shaped groove 5 which receives a locking ledge stripe 1c, having a V-shaped cross section, around a circumference of a lens. There are formed a first frictional biting-into protrusion stripe 6a and a second frictional biting-into protrusion stripe 6b, respectively, on a first inclined bottom surface 5a and a second inclined bottom surface 5b defining the V-shaped groove 5. The first and second frictional biting-into protrusion stripes 6a, 6b extend in a direction in which the glasses' front frame extends, locate near upper edges of the first inclined bottom surface 5a and the second inclined bottom surface 5b defining the V-shaped groove 5, and contact a part of a first inclination bottom surface 1a of the locking ledge 1c of the lens 1 and a part of a second inclination bottom surface 1b thereof.

9 Claims, 3 Drawing Sheets

LENS HOLDING MECHANISM OF FRONT FRAME FOR SPECTACLES

TECHNICAL FIELD

The present invention generally relates to a front frame used for a pair of spectacles, and particularly relates to a lens holding mechanism of the front frame.

BACKGROUND ARTS

A lens used for a pair of spectacles is generally supported by a ring-shaped front frame thereof (see FIG. 1). In case that a user wears or handles the spectacles, an external force is often exerted upon the frame or the lens. In that case, depending upon a magnitude and/or a direction of the external force thus exerted thereupon, the lens and/or the frame are/is deformed, so that the lens is often disengaged from the frame. In particular, because the spectacles used in recent years are the ones in which the lens is made of plastic and the frame is made of metal, the spectacles are liable to deformation by the external force. Therefore, the lens may be easily disengaged therefrom even by a small external force exerted thereupon. It is needless to say that such a disengagement of the lens therefrom is undesirable.

In case that the spectacles are used for protecting a user's eyeball in order to give a top priority to safety (for example, the spectacles which are used in a hazardous environment, such as a factory), a lens holding mechanism shown in FIG. 2 is adopted. With the lens holding mechanism, the lens is never disengaged from the front frame thereof, even when some external force is exerted upon the spectacles. In this mechanism, the front frame 2 has a sectional structure with a relatively deep U-shaped groove 3 which is defined by a bottom wall 4a, a first side wall (wall on a side of a face) 4b, and a second side wall 4c (wall on a side opposite the face). The lens 1 has a circumferential edge having a square-shaped cross section, and the circumferential edge is fitted deep inside the U-shape groove 3. Therefore, the circumferential edge of the lens 1 is surely held between the side walls 4b, 4c on both sides of the lens 1, and the lens is not easily disengaged from the frame even when some external force is applied thereto.

The lens holding mechanism employing the U-shaped groove type shown in FIG. 2 is superior in safety; on the other hand, the lens holding mechanism is inferior in fashionability. The reason is that it is necessary to secure a deep engagement depth or part, for the lens, in the frame, that it is necessary to provide a structure in which the lens is supported by the both side walls from both sides of the lens, and that the front frame, therefore, can not help but become large, or thick.

In contrast with the lens holding mechanism of FIG. 2, a most popular lens holding mechanism having a good fashionability, in other words, having a small line diameter, is shown in FIG. 3. In this mechanism, the front frame 2 has a sectional structure with a V-shaped groove 5 which is defined by a first inclined bottom surface (bottom surface on a side of a face) 5a, and a second inclined bottom surface (bottom surface on a side opposite the face) 5b. The lens 1 has a circumferential edge having an engagingly locking convex stripe (="Yagen", V-shaped ledge) 1c which is V-shaped in cross section and which corresponds to the sectional configuration of the frame. The engagingly locking convex stripe 1c is fitted into the V-shaped groove 5 with a slight play P with a state in which the engagingly locking convex stripe 1c roughly contacts the inclined bottom surface (refer to the circumferential edge of the lens shown in a solid line in the figure). In case that the thickness (="koba", edge) of the lens 1 is large (in case that the degree of the spectacles is high), the width of the V-shaped engagingly locking convex stripe 1c of the lens is smaller than the thickness of the lens, as shown in the figure.

According to the lens holding mechanism shown in FIG. 3, it has an advantage that the line diameter of the front frame can be reduced by reducing the thickness of the frame with respect to the thickness of the lens.

However, the lens holding mechanism of FIG. 3 has such a problem that the lens is apt to become easily disengaged from the front frame when an external force is exerted thereon. An imaginary line of FIG. 3 shows a situation in which the lens 1 is disengaged from the front frame due to an external force "F" which is exerted upon the lens 1. Namely, it is conceivable that the lens 1 and the frame 2 are deformed by the external force "F", that a first inclined bottom surface 1a of the lens 1 is easily allowed to slide over the first inclined bottom surface 5a defining the V-shaped groove of the front frame 2 as a result, and that the lens 1 is dropped out from the front frame 2. Where an importance is placed on the fashionability of the spectacles, an attempt may be made to reduce the thickness of the front frame along its length and may be made to reduce the depth of the V-shaped groove thereof. As a result, the tendency of the lens falling or dropping out therefrom, will increase. However, even if the front frame is of a type of the V-shaped groove, it is possible to prevent the lens from dropping out therefrom by making the V-shaped groove sufficiently deep. Actually, many varieties of such front frames are commercially available. But where the V-shaped groove is made deeper, the line diameter of the front frame becomes thicker; accordingly, it lacks fashionability.

From a global point of view, spectacles have a very long history. Strangely enough, however, any countermeasure to prevent the lens of spectacles from falling or dropping out therefrom, particularly to prevent the lens thereof from falling or dropping out therefrom in the lens holding mechanism which is of the type of the V-shaped groove shown in FIG. 3, has been scarcely taken.

DISCLOSURE OF INVENTION

Therefore, it is a main object of the present invention to provide a novel lens holding mechanism, or a front frame, which effectively prevents a lens of the pair of spectacles from dropping out.

It is another object thereof to provide the lens holding mechanism, of a type of V-shaped groove, effectively preventing the lens thereof from dropping out, which is simple in construction while maintaining a fashionability of the front frame or maintaining a small linear diameter of the frame.

It is still another object thereof to provide the novel lens holding mechanism, able to effectively prevent the lens thereof from dropping out, which makes it possible to maintain a manufacturing cost of the front frame at the level substantially equal to the conventional level.

In order to achieve these technical objects, according to the present invention, there is provided a front frame for a pair of spectacles with the following construction.

That is, the front frame therefor has a V-shaped groove that engages with an engagingly locking convex stripe, having a V-shaped cross section, around a circumferential edge of a lens, and a first frictional biting-into protrusion stripe on a first inclined bottom surface defining the V-shaped groove, wherein the first frictional biting-into protrusion stripe extends in a direction in which the front frame extends, and wherein the first frictional biting-into protrusion stripe contacts a part of a first inclination bottom surface of the engagingly locking convex stripe of the lens. Preferably, the first inclined bottom surface of the V-shaped groove is on a side of a face of a wearer or user who puts on the pair of spectacles. Each of the inclination bottom surface of the engagingly locking convex stripe having the V-shaped cross section and the inclined bottom surface of the V-shaped groove, includes a case in which it is a flat surface, and includes a case in which it is a roundly curving surface.

In the aforementioned construction, a lower part of the engagingly locking convex stripe having the V-shaped cross section of the lens, contacts the front frame near the lowermost part of the V-shaped groove; and a part of the first inclination bottom surface of the engagingly locking convex stripe having the V-shaped cross section of the lens, contacts the first frictional biting-into protrusion stripe, generally with a slight play or gap therebetween. The second inclination bottom surface of the engagingly locking convex stripe having the V-shaped cross section of the lens totally contacts the second inclined bottom surface of the V-shaped groove.

According to the aforementioned construction, for example, in case that an external force is exerted upon the lens in a direction towards a face of the user, the lens or front frame is deformed. As a result, the first inclination bottom surface of the lens is slid relative to the first inclined bottom surface of the front frame in a direction in which the lens is dropped out from the front frame towards the face of the user. However, at this time, the first frictional biting-into protrusion stripe functions so as to bite into, or cut into, the first inclination bottom surface of the lens. Namely, a great friction is exerted between the first frictional biting-into protrusion stripe and the first inclination bottom surface, so that the sliding movement therebetween is blocked. Therefore, the lens is prevented from dropping out therefrom.

As described above, when the user puts on the spectacles, normally, the external force (outer force) is often applied towards the face of the user. Accordingly, it is the most effective that the frictional biting-into protrusion stripe to be provided inside the V-shaped groove of the front frame is formed on the inclined bottom surface thereof on the side of the user's face. However, in order to surely prevent the lens from dropping out therefrom no matter which direction the external force is exerted in thereupon, it is preferable that there is further provided a second frictional biting-into protrusion stripe, similar to the first frictional engagingly locking protrusion stripe, on a second inclined bottom surface defining the V-shaped groove, wherein the second frictional biting-into protrusion stripe extends in the direction in which the front frame extends, and wherein the second frictional biting-into protrusion stripe contacts a second inclination bottom surface of the engagingly locking convex stripe of the lens.

It is preferable that the first frictional biting-into protrusion stripe is provided near an upper edge of the first inclined bottom surface of the V-shaped groove, and the second frictional biting-into protrusion stripe is provided near an upper edge of the second inclined bottom surface of the V-shaped groove, with which construction the lens is more effectively prevented from dropping out therefrom.

The front frame with the aforementioned construction, is particularly effective in case that the front frame is made of metal. That is, the front frame is usually made of metal. The V-shaped groove is formed on a metal wire member having a suitable line diameter by a drawing molding method (or pull-out molding method), and then the metal wire member is formed into a suitable ring shape. Namely, the first frictional biting-into protrusion stripe and the second frictional biting-into protrusion stripe extend in the direction in which the front frame extends; in other words, they extend along an axial direction of the metal wire member. Therefore, this can be molded by the drawing molding method in the same way as in the prior art. For the purpose of molding the first and second frictional engagingly locking protrusion stripes, no specially additional processing is required. It is necessary only to change the configuration of a drawing hole (or pull-out hole) of its die used for the drawing molding process.

According to the construction, the dropping out of the lens therefrom is very much effectively prevented, only by additionally forming the frictional biting-into protrusion stripe on the inclined bottom surface defining the V-shaped groove of the conventional front frame.

BRIEF DESCRIPTION OF DRAWINGS

One embodiment of the present invention will now be described in detail with reference to the accompanying drawings, in which.

BEST MODE FOR CARRYING OUT THE INVENTION

Figure 1:
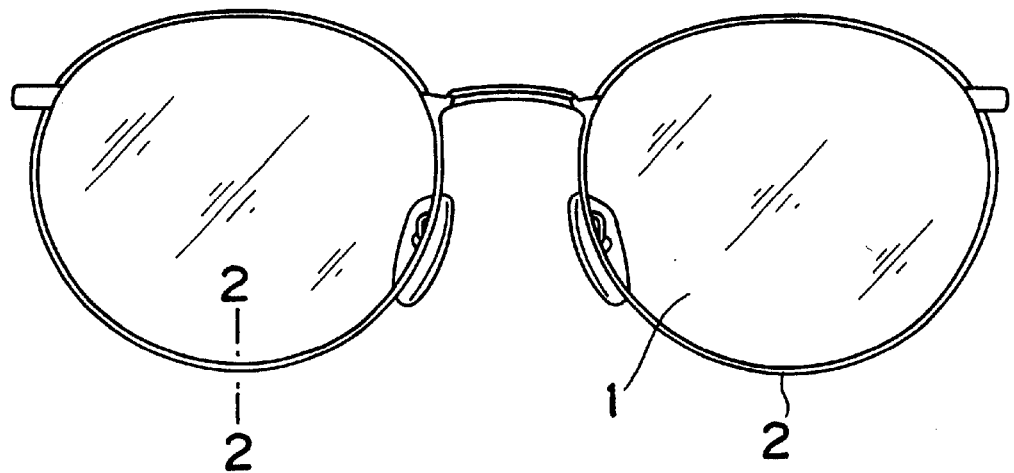
FIG. 1 is a front view of a pair of spectacles.
Figure 2:
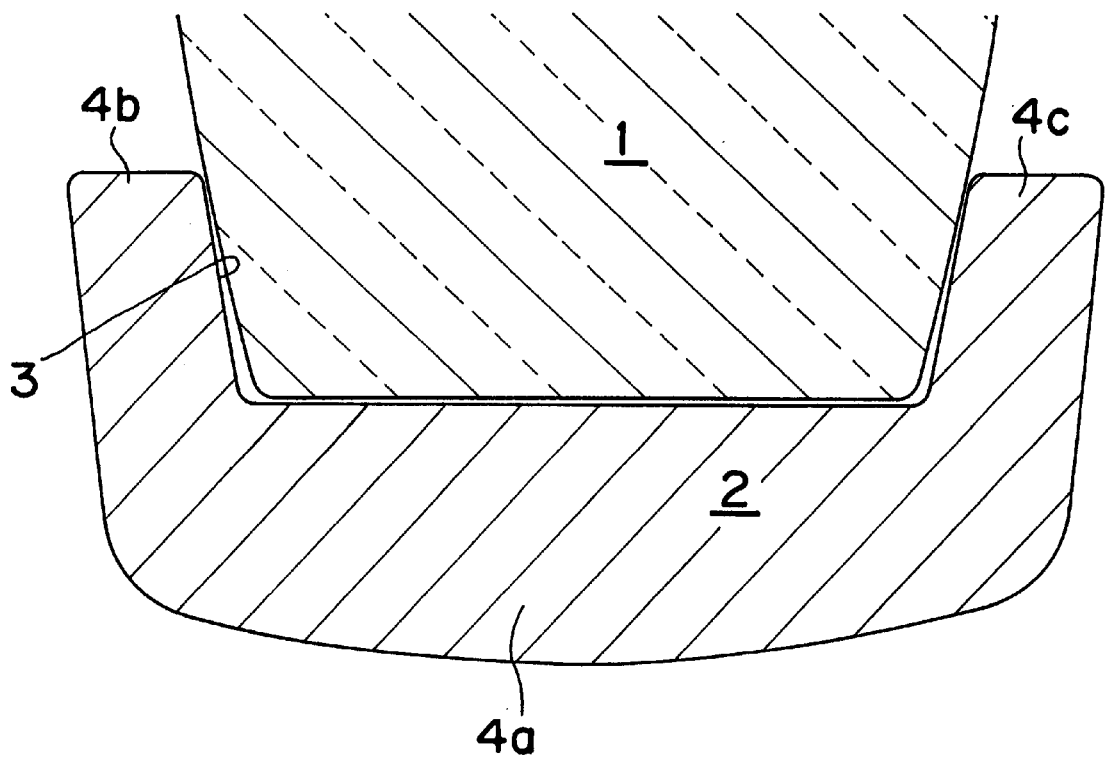
FIG. 2 is an enlarged sectional view, taken on a line corresponding with 2—2 in FIG. 1, showing a main part of a lens holding mechanism of a conventional type of U-shaped groove.
Figure 3:
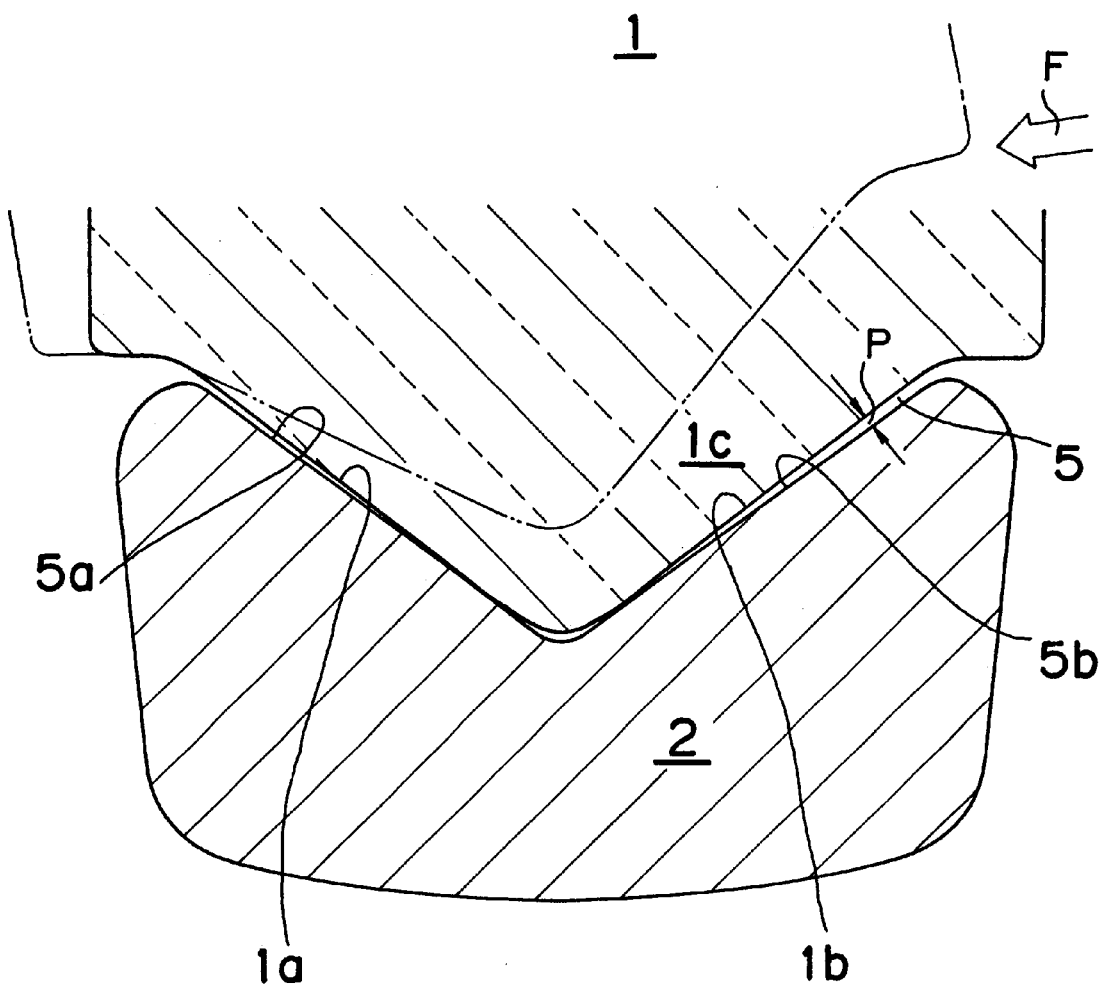
FIG. 3 is an enlarged sectional view, similar to FIG. 2, showing a main part of a lens holding mechanism of a conventional type of V-shaped groove.
Figure 4:
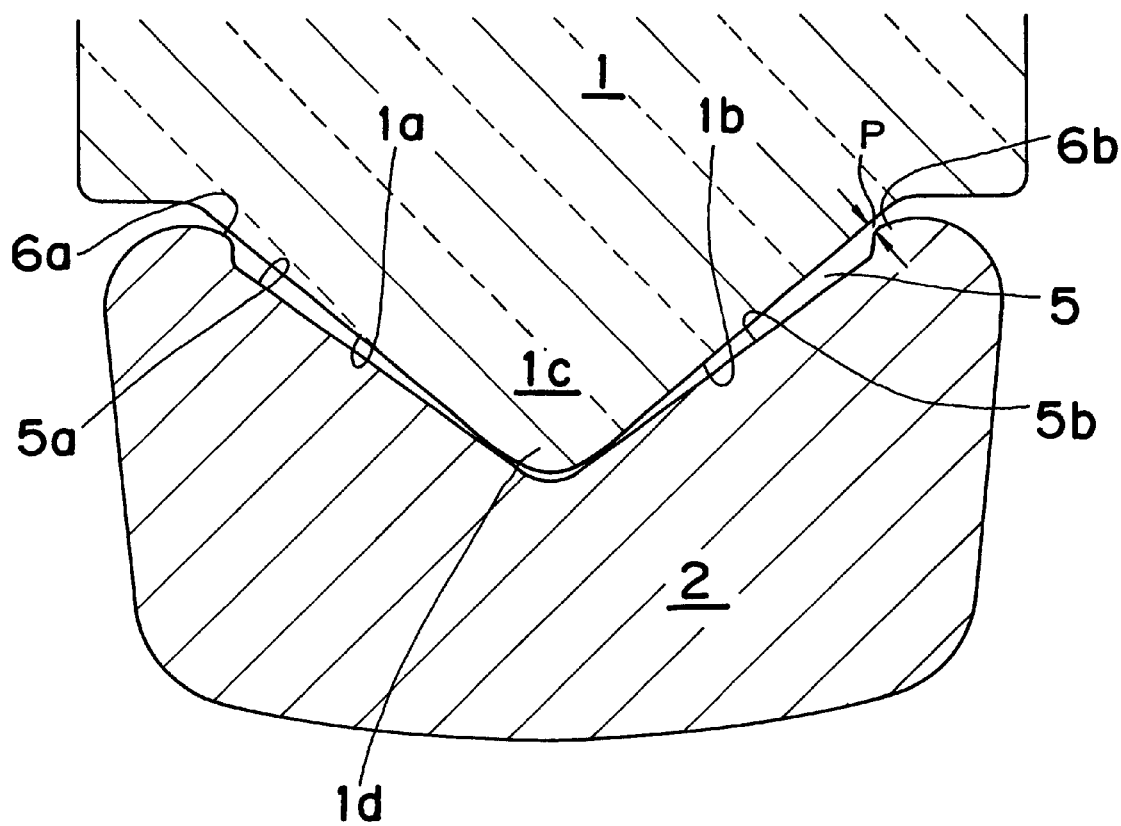
FIG. 4 is an enlarged sectional view, similar to FIG. 2, showing a main part of a lens holding mechanism according to an embodiment of the present invention.

In FIG. 4 which shows an embodiment of the present invention, a reference numeral 1 designates a lens, and 2 designates a front frame, made of metal, for holding the lens 1. The lens 1 has a circumferential edge having an engagingly locking convex stripe 1c which extends in a direction of its periphery, like the prior art example shown in FIG. 3. The engagingly locking convex stripe 1c is formed V-shaped in cross section. The engagingly locking convex stripe 1c has a maximum width dimension which is smaller than a width dimension of a circumferential edge of the lens. The engagingly locking convex stripe 1c has an open angle generally between 100 and 130 degrees.

On the other hand, the front frame 2 has a V-shaped groove 5 with which the engagingly locking convex stripe 1c of the lens 1 engages, like the prior art example of FIG. 3. The V-shaped groove 5 has an open angle which is slightly greater than the open angle of the engagingly locking convex stripe 1c of the lens, so as to be adaptable for general purpose use with different lenses. There is provided a frictional biting-into protrusion stripe 6a (6b) adjacent each of upper ends of the pair of inclined bottom surfaces 5a, 5b which define the V-shaped groove 5. Each of the frictional biting-into protrusion stripes 6a, 6b extends in a direction in which the front frame extends, and each thereof has a contact part with a very small area which contacts with a very small portion of each of a pair of inclination bottom surfaces 1a, 1b of the engagingly locking convex stripe 1c of the lens.

When the engagingly locking convex stripe 1c of the lens 1 is in a state in which the engagingly locking convex stripe 1c thereof engages with the V-shaped groove 5 of the front frame 2, a tip part 1d of the engagingly locking convex stripe 1c thereof contacts each of the inclined bottom surfaces 5a, 5b at a location near a lowest bottom of the V-shaped groove 5. Therefore, each of the inclination bottom surfaces 1a, 1b of the lens is in a state in which each thereof floats over each of the inclined bottom surfaces 5a, 5b without contacting each thereof, between each of the frictional biting-into protrusion stripes 6a, 6b and each of their contacting parts of the inclined bottom surfaces 5a, 5b at the location near the lowest bottom of the V-shaped groove 5. It is to be noted that there is provided some play "P" between the both inclination bottom surfaces 1a, 1b of the lens and the both frictional biting-into protrusion stripes 6a, 6b. The reason why there is provided the play therebetween is for the purpose of enabling the front frame to be applicable to any lens with a slightly different dimension.

According to the lens holding mechanism with the aforementioned arrangement, when an external force is exerted upon the lens or the front frame from any direction, and when the lens is tried to be moved relative to the front frame by the external force, one of the frictional biting-into protrusion stripes 6a, 6b functions so as to cut or bite into its contacting part of the inclination bottom surface 1a (1b) of the engagingly locking convex stripe of the lens. Therefore, any relative slide movement between the inclination bottom surface of the lens and the inclined bottom surface of the front frame is difficult to occur; as a result, the lens is effectively prevented from dropping out therefrom.

The aforementioned embodiment shown in FIG. 4 is the best mode. However, the present invention can also be embodied by other embodiments. Namely, each of the frictional biting-into protrusions 6a, 6b may be provided more adjacent to a center of the frame than the position shown in the figure. However, if the position thereof is excessively close to the center thereof, the effect to prevent the lens from dropping out therefrom is diminished, which is undesirable.

Also, according to the aforementioned embodiment, the frictional biting-into protrusion stripe is formed on each of the two inclined bottom walls defining the V-shaped groove. Therefore, even if an external force is exerted thereon from any direction, the arrangement thereof is effective for preventing the lens from dropping out therefrom. However, the direction in which the external force is exerted on the spectacles when the user wears them, is normally a direction from outside towards the user's face (wearer's face). Accordingly, it is possible to provide the frictional biting-into protrusion stripe 6a only on one 5a of the inclined bottom surfaces on a side of the user's face, and it is possible not to provide the frictional biting-into protrusion stripe 6b on the other 5b of the inclined bottom surfaces. In this arrangement, the inclination bottom surface 1b of the engagingly locking convex stripe of the lens is extended generally along the inclined bottom surface 5b of the V-shaped groove so as to totally contact the inclined bottom surface 5b.

In the aforementioned embodiment, the front frame is made of metal. However, it is needless to say that the effect to prevent the lens from dropping out therefrom is realized even if the front frame is made of plastic.

What is claimed is:

1. A front frame for a pair of spectacles, comprising:
   a V-shaped groove that engages with an engagingly locking convex stripe, having a V-shaped cross section, around a circumferential edge of a lens, wherein first and second inclination bottom surfaces of the engagingly locking convex stripe form a tip part that contacts first and second inclined bottom surfaces defining the V-shaped groove, at a location near a lowest bottom portion of the V-shaped groove, and
   a first frictional biting-into protrusion stripe on the first inclined bottom surface of the V-shaped groove,
   wherein the first frictional biting-into protrusion stripe extends in a direction in which the front frame extends, and wherein the first frictional biting-into protrusion stripe contacts a part of the first inclination bottom surface of the engagingly locking convex stripe of the lens, such that between the first frictional biting-into protrusion stripe and the location of contact near the lowest bottom portion of the V-shaped groove there is a section of the first inclination bottom surface that does not contact the first inclined bottom surface.

2. The front frame as claimed in claim 1, wherein the first inclined bottom surface of the V-shaped groove is on a side of a face of a wearer who puts on the pair of spectacles.

3. The front frame as claimed in claim 1, wherein the first frictional biting-into protrusion stripe is provided near an upper edge of the first inclined bottom surface of the V-shaped groove.

4. The front frame as claimed in claim 1, further comprising a second frictional biting-into protrusion stripe on the second inclined bottom surface defining the V-shaped groove, wherein the second frictional biting-into protrusion stripe extends in the direction in which the front frame extends, and wherein the second frictional biting-into protrusion stripe contacts the second inclination bottom surface of the engagingly locking convex stripe of the lens.

5. The front frame as claimed in claim 4, wherein the second frictional biting-into protrusion stripe is provided near an upper edge of the second inclined bottom surface of the V-shaped groove.

6. The front frame as claimed in claim 1, which is made of metal.

7. A front frame for a pair of spectacles adapted to engage a circumferential edge of a lens having an engagingly locking convex stripe with a V-shaped cross section, comprising:
   a V-shaped groove having first and second inclined bottom surfaces defining the V-shaped groove and having a lowermost portion of the V-shaped groove for contacting a lens so as to support the lens, and
   a first frictional biting-into protrusion stripe on the first inclined bottom surface of the V-shaped groove located apart from the lowermost portion of the V-shaped groove,
   wherein when the first frictional biting-into protrusion stripe contacts a part of a lens supported in the frame, a portion of the first inclined bottom surface of the V-shaped groove between the first frictional biting-into protrusion stripe and the lowermost portion of the V-shaped groove does not contact the supported lens.

8. A frame for a pair of spectacles adapted to engage a lens, comprising:
   a groove having a bottom surface and a lowermost portion of the groove for contacting a lens so as to support the lens, and
   a first frictional biting-into protrusion stripe on the bottom surface of the groove located apart from the lowermost portion of the groove,
   wherein when the first frictional biting-into protrusion stripe contacts a part of a lens supported in the frame, a portion of the bottom surface of the groove between the first frictional biting-into protrusion stripe and the lowermost portion of the groove does not contact the supported lens.

9. A front frame for a pair of spectacles adapted to engage a circumferential edge of a lens having an engagingly locking convex stripe with a V-shaped cross section, comprising:

a V-shaped groove, and a first frictional biting-into protrusion stripe on a first inclined bottom surface defining the V-shaped groove, wherein the first frictional biting-into protrusion stripe extends in a direction in which the front frame extends, and has a substantially pointed contact surface area for contacting a relatively small area on a first inclination bottom surface of an engagingly locking convex stripe of a lens.

* * * * *